United States Patent [19]

Horiuchi

[11] Patent Number: 5,353,157
[45] Date of Patent: Oct. 4, 1994

[54] REAR FOCUSING ZOOM LENS
[75] Inventor: Akihisa Horiuchi, Kanagawa, Japan
[73] Assignee: Canon Kabushiki Kaisha, Tokyo, Japan
[21] Appl. No.: 27,592
[22] Filed: Mar. 5, 1993

Related U.S. Application Data

[63] Continuation of Ser. No. 740,303, Aug. 5, 1991, abandoned.

[30] Foreign Application Priority Data

Aug. 21, 1990 [JP] Japan .................. 2-220793
Aug. 21, 1990 [JP] Japan .................. 2-220794

[51] Int. Cl.$^5$ ............................................. G02B 15/14
[52] U.S. Cl. .................................. 359/676; 359/687; 359/774
[58] Field of Search ............... 359/686, 687, 676, 654, 359/683, 653, 688, 774, 684

[56] References Cited

U.S. PATENT DOCUMENTS

| | | | |
|---|---|---|---|
| 4,763,998 | 8/1988 | Tsuji et al. | 359/687 |
| 4,802,747 | 2/1989 | Horiuchi | 359/687 |
| 4,810,070 | 3/1989 | Suda et al. | 359/653 |
| 4,854,681 | 8/1989 | Kato et al. | 359/687 |
| 4,854,684 | 8/1989 | Horiuchi | 359/687 |
| 4,952,039 | 8/1990 | Ito | 359/687 |
| 5,009,492 | 4/1991 | Hamano | 359/684 |
| 5,032,013 | 7/1991 | Shibayama | 359/676 |
| 5,221,994 | 6/1993 | Nishio | 359/687 |
| 5,241,421 | 8/1993 | Endo et al. | 359/688 |
| 5,285,317 | 2/1994 | Uzawa | 359/687 |

FOREIGN PATENT DOCUMENTS

| | | |
|---|---|---|
| 62-24213 | 2/1987 | Japan . |
| 63-123009 | 5/1988 | Japan . |
| 64-68709 | 3/1989 | Japan . |
| 0255308 | 2/1990 | Japan . |
| 4-343313 | 11/1992 | Japan . |

Primary Examiner—Paul M. Dzierzynski
Assistant Examiner—Kim-Kwok Chu
Attorney, Agent, or Firm—Fitzpatrick, Cella, Harper & Scinto

[57] ABSTRACT

A zoom lens includes, in the order from the object side, a first lens unit of positive refractive power, a second lens unit of negative refractive power, a third lens unit of positive refractive power and a fourth lens unit of positive refractive power. The first and third lens units are stationary. The second lens unit is moved in one direction to vary the magnification. The fourth lens unit is moved so as to compensate for the shift of an image plane resulting from the variation of the magnification, and focusing is performed by moving the fourth lens unit. The third lens unit has a bi-convex lens and a negative meniscus lens having a strong concave surface facing the object side, and the fourth lens unit has a negative meniscus lens having a strong concave surface facing the image side, a bi-convex lens and a positive lens having a strong convex surface facing the object side.

12 Claims, 8 Drawing Sheets

REAR FOCUSING ZOOM LENS

This application is a continuation of application Ser. No. 07/740,303 filed Aug. 5, 1991, now abandoned.

BACKGROUND OF THE INVENTION

1. Field of the Invention

This invention relates to zoom lenses and, more particularly, to zoom lenses of compact size and light weight at an F-number of 1.8 to 2.0 with still as high a zoom ratio as about 8, while having a good optical performance over the entire zooming range, suited to cameras for photography, video cameras, etc.

2. Description of the Related Art:

Among the zoom lenses of a relatively high range with a large relative aperture used in still cameras or video cameras, there has been the so-called 4-unit zoom lens. This 4-unit type of zoom lens comprises, from front to rear, a first lens unit for focusing, a second lens for varying the magnification, a third lens unit for compensating for the image shift resulting from variation of the magnification, and a fourth lens unit for use in balancing the focal length of the entire system and correcting aberrations. In the 4-unit zoom lens, a configuration employed is that for the zooming purpose, two lens units, and, for the focusing purpose, another one lens unit, totaling three lens units, are made movable. For this reason, there is a tendency to have a relatively complicated mounting mechanism for such a zoom lens.

Also, when focusing to shorter object distances, the first lens unit moves toward the object side. Accordingly, admission of a sufficient off-axial light beam to enter the zoom lens results in another tendency for the diameter of the front lens members to increase largely.

For these reasons, there have been many previous proposals for zoom lenses in which a lens unit other than the first lens unit is employed in focusing, or which utilize the so-called rear focus method, in, for example, Japanese Laid-Open Patent Applications Nos. Sho 62-24213, Sho 63-123009 and Hei 2-55308.

By the way, in the above-described publications, the zoom lenses disclosed have a zoom ratio of 6 to 8 or thereabout. However, the number of constituent lens elements is relatively large. An attempt to use a smaller number of lens elements in constructing the zoom lens of a range of about 8 leads to a tendency to increase the amount of movement of the fourth lens unit from an infinitely distant object to a closest object, which in turn increases the variation of aberrations with focusing. So, this increased range of variation of aberrations becomes difficult to correct. As the related art of the present invention, there are U.S. Pat. No. 5,009,492 and U.S. patent application Ser. No. 647,495 filed on Jan. 29, 1991, now U.S. Pat. No. 5,241,421, issued on Aug. 31, 1993.

SUMMARY OF THE INVENTION

With such a problem in mind, the invention has, despite simultaneous occurrence of a high range and promotion to a compact form by making ever smaller the optical effective diameter and ever shorter the total lens length, to realize an aperture ratio of about F1.8–2.0. In addition, variation of aberrations with zooming over the high range and variation of aberrations with focusing are well corrected. Thus, the invention proposes a rear focus type zoom lens of compact form and light weight.

The zoom lens of the invention comprises, in the order from the object side, a first lens unit of positive refractive power, a second lens unit of negative refractive power, a third lens unit of positive refractive power and a fourth lens unit of positive refractive power, wherein the first and third lens units are made stationary, variation of the magnification is performed by moving the second lens unit in one direction, the fourth lens unit is made to move so as to compensate for the shift of an image plane resulting from the variation of the magnification, and focusing is performed by moving the fourth lens unit. The aforesaid third lens unit has a bi-convex lens and a negative meniscus lens having a strongly refractive concave surface facing the object side. The aforesaid fourth lens unit has a negative meniscus lens having a strongly refractive concave surface facing the image side, a bi-convex lens and a positive lens having a strongly refractive convex surface facing the object side.

BRIEF DESCRIPTION OF THE DRAWINGS

In the graphs of aberrations, FIGS. 2(A), 3(A), 5(A) and 6(A) are the graphs of aberrations in the wide angle end, FIGS. 2(B), 3(B), 5(B) and 6(B) in the middle, and FIGS. 2(C), 3(C), 5(C) and 6(C) in the telephoto end.

In the figures, I, II, III and IV are respectively the first, second, third and fourth lens units. ΔM is the meridional image surface and ΔS is the sagittal image surface, d is the d-line, g is the g-line, and SP is a stop.

DETAILED DESCRIPTION OF THE PREFERRED EMBODIMENTS

Figure 1:
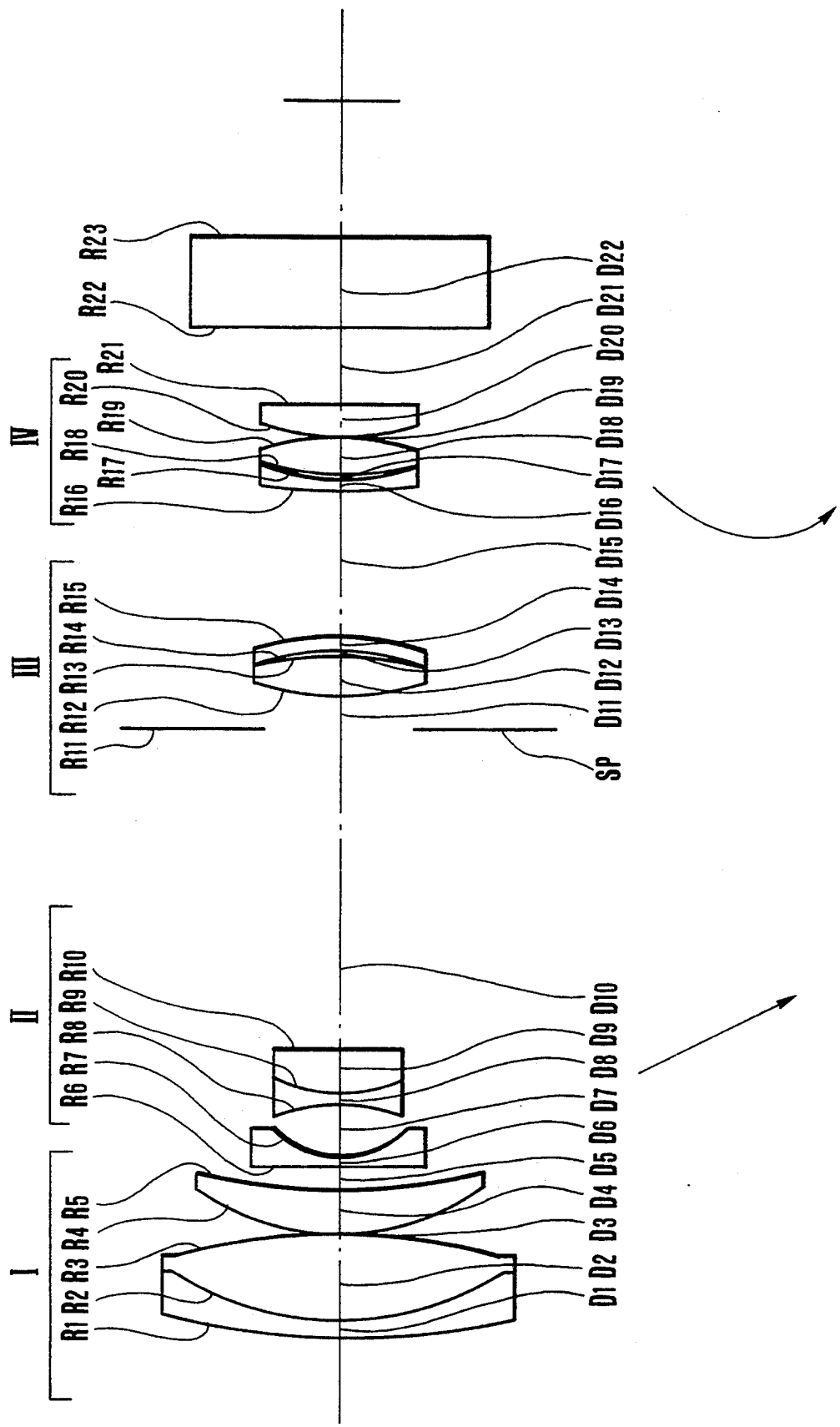
FIG. 1 and FIG. 4 are sectional views of numerical examples 1 and 3 of zoom lenses of the invention.
Figure 2A:
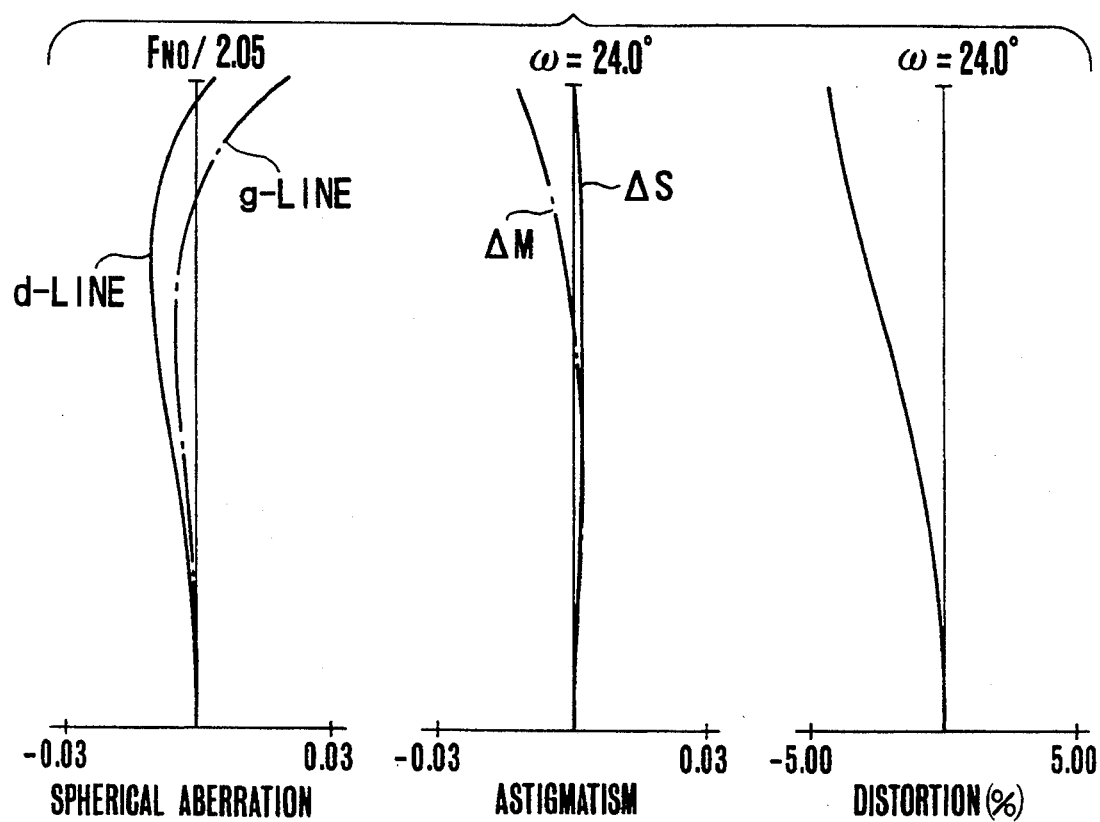
FIGS. 2(A), 2(B) and 2(C), FIGS. 3(A), 3(B) and (C), FIGS. 5(A), 5(B) and 5(C) and FIGS. 6(A), 6(B) and (C) are graphs of various aberrations of the numerical examples 1 to 4 of the invention respectively.
Figure 2B:
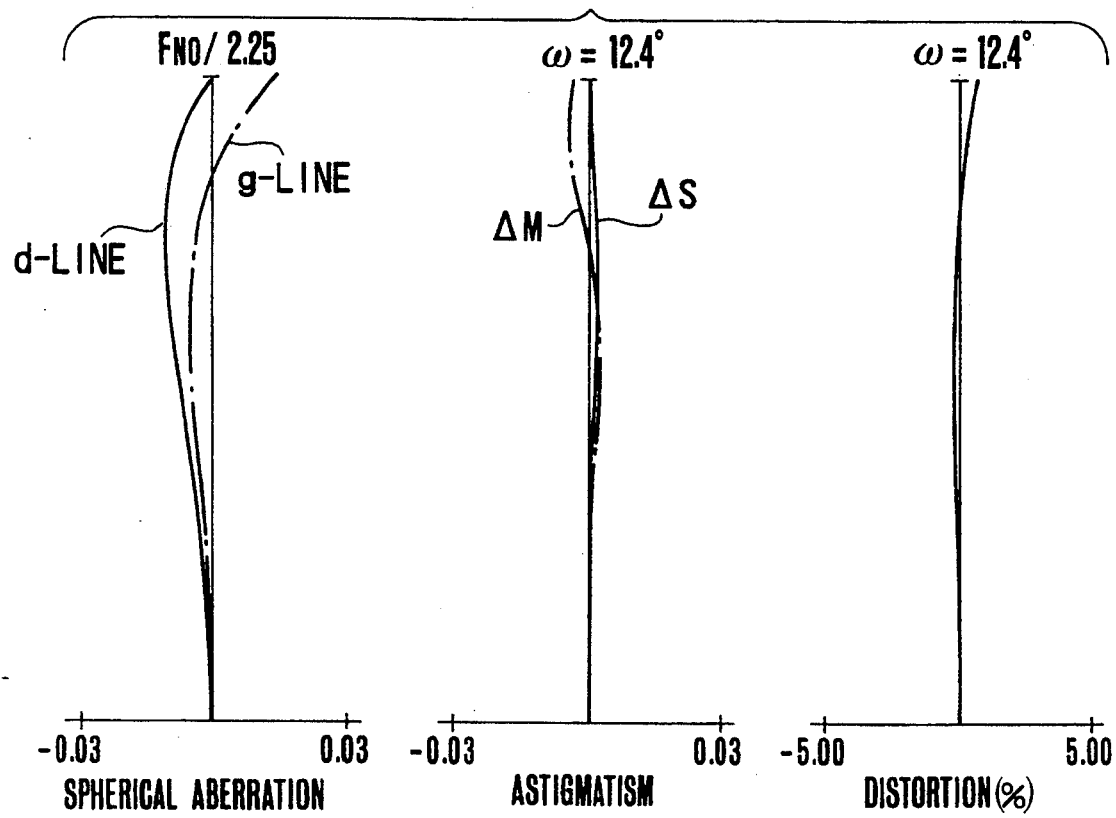
Figure 2C:
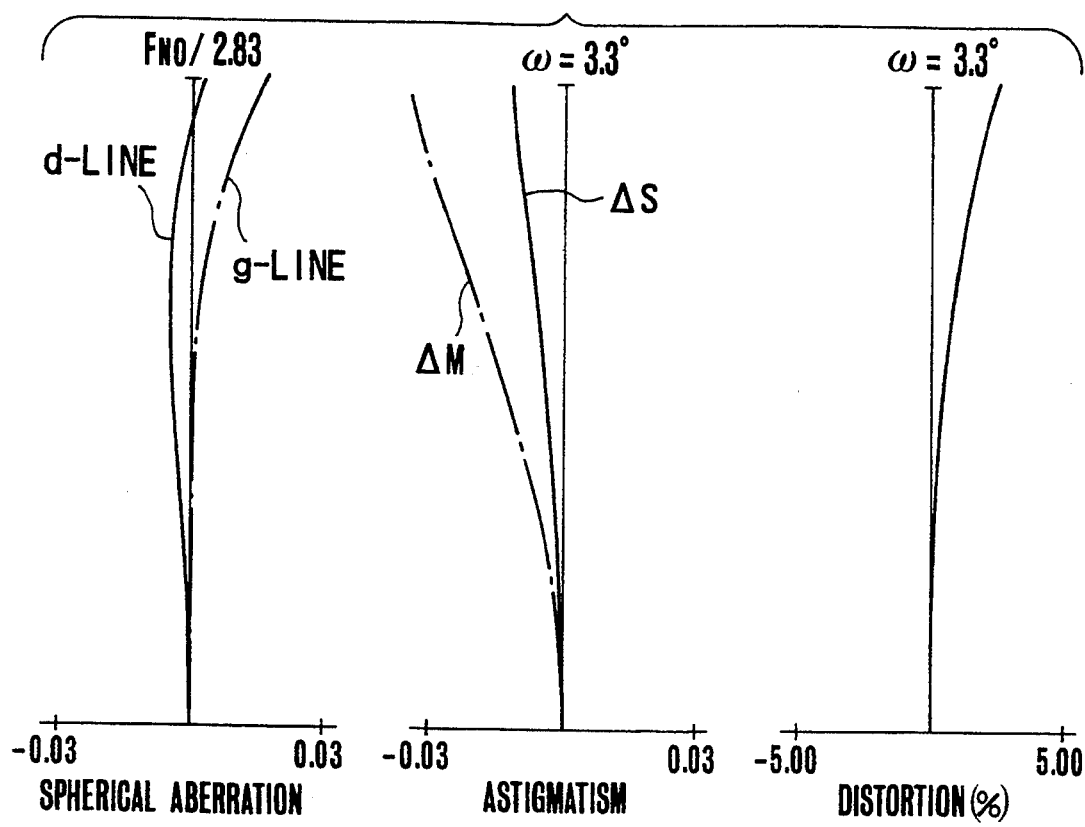

FIG. 1 is a lens sectional view of the numerical example 1 of the invention. In the figure, I is the first lens unit of positive refractive power, II is the second lens unit of negative refractive power, which moves monotonously toward the image side during variation of the magnification from the wide-angle end to the telephoto end, III is the third lens unit of positive refractive power, IV is the fourth lens unit of positive refractive power, which moves on an optical axis while having a locus of convex shape toward the object side covering from the wide-angle end to the telephoto end in order to keep the image plane that moves with variation of the magnification at a constant position and which also moves along the optical axis for focusing, SP is a fixed stop or diaphram arranged in the third lens unit. It is to be noted that the first and third lens units are stationary during variation of the magnification and during focusing.

In the present embodiment, during focusing, the first lens unit is not moved, but remains always stationary. Thus, the increase of the lens diameter, which would be caused by the forward movement, is prevented. During focusing, instead of the first lens unit, the fourth lens unit that is part of the magnification varying system is made to move. Therefore, the number of movable lens units is reduced. Thus, the mechanism is simplified in structure. Also, while letting the fourth lens unit have both of the functions of varying the magnification and focusing, the fourth lens unit is made to move within a space between the third lens unit and the fourth lens unit. Therefore, an efficient utilization of the space within the lens system is performed. In such a manner, a shortening of the total lens length is achieved.

Further, by constructing the third lens unit with a bi-convex lens and a negative meniscus lens having a strongly refractive concave surface facing the object side, spherical aberration and coma are well corrected. By constructing the fourth lens unit with a negative meniscus lens having a strongly refractive concave surface facing the image side, a bi-convex lens and a positive lens having a strongly refractive convex surface facing the object side, variation of aberration due to focusing from a closest object to an infinitely distant object, particularly curvature of field and astigmatism, are corrected.

The zoom lens the invention aims at can be achieved by the above-described form and construction and arrangement. Further, in view of aberration correction, letting the radius of curvature of the j-th lens surface in the i-th lens unit be denoted by $R_{i,j}$, the j-th lens thickness or air separation in the i-th lens unit by $D_{i,j}$, and the focal length in the wide-angle end by fw, it is preferred to satisfy the following conditions:

$$-1.75 < R_{3,1}/R_{3,3} < -1.10 \quad (1)$$

$$0.7 < R_{4,3}/R_{4,5} < 1.0 \quad (2)$$

$$0.07 < D_{3,2}/fw < 0.12 \quad (3)$$

$$0.01 < D_{4,2}/fw < 0.03 \quad (4)$$

The inequalities of condition (1) are concerned with the ratio of the radius of curvature of the first lens surface, when counted from the object side, in the third lens unit to the radius of curvature of the third lens surface in the third lens unit, being the condition chiefly for properly correcting spherical aberration. When the lower limit is exceeded, the spherical aberration becomes under-corrected. Also, when the upper limit is exceeded, it becomes over-corrected.

The inequalities of condition (2) are concerned with the ratio of the radius of curvature of the third lens surface, when counted from the object side, in the fourth lens unit to the radius of curvature of the fifth lens surface in the fourth lens unit, being a condition for correcting curvature of field and coma in good balance. When the lower limit is exceeded, the curvature of field becomes under-corrected and, further, large inward coma is produced. Also, when the upper limit is exceeded, the curvature of field becomes over-corrected and, further, large outward coma is produced, which becomes difficult to correct well. Also, the variation of astigmatism due to focusing from a closest object to an infinitely distant object becomes large.

The inequalities of condition (3) are a condition chiefly for correcting spherical aberration and astigmatism in good balance. When the lower limit is exceeded, the astigmatism becomes large. Also, when the upper limit is exceeded, spherical aberrations of higher order are produced.

The inequalities of condition (4) are a condition chiefly for correcting coma and distortion. When the lower limit is exceeded, outward coma is produced and it becomes difficult to correct well. Also, when the upper limit is exceeded, distortion of barrel type is produced in the wide-angle end, which is no good.

Next, numerical examples 1 and 2 of the invention are shown. In the numerical examples 1 and 2, Ri is the radius of curvature of the i-th lens surface in the order from the object side, Di is the i-th lens thickness and air separation from the object side, and Ni and $\nu$i are respectively the refractive index and Abbe number of the glass of the i-th lens in the order from the object side. R22 and R23 are a face plate, filter or the like.

Also, the relationship of the above-described inequalities of conditions (1) to (4) and the various numerical values in the numerical examples 1 and 2 is shown in Table 1.

| Numerical Example 1 (FIGS. 1, 2(A), 2(B) and 2(C)): F = 1–7.67  FNo 1:2.05–2.83  2ω = 47.9°–6.6° | | | |
|---|---|---|---|
| R1 = 7.8663 | D1 = 0.1667 | N1 = 1.80518 | ν1 = 25.4 |
| R2 = 3.3829 | D2 = 0.7222 | N2 = 1.51633 | ν2 = 64.1 |
| R3 = −8.0915 | D3 = 0.0278 | | |
| R4 = 2.5531 | D4 = 0.4028 | N3 = 1.60311 | ν3 = 60.7 |
| R5 = 6.2798 | D5 = Variable | | |
| R6 = 16.6730 | D6 = 0.1111 | N4 = 1.69680 | ν4 = 55.5 |
| R7 = 1.0768 | D7 = 0.4891 | | |
| R8 = −1.5016 | D8 = 0.0972 | N5 = 1.69680 | ν5 = 55.5 |
| R9 = 1.5016 | D9 = 0.3750 | N6 = 1.84666 | ν6 = 23.9 |
| R10 = −14.9686 | D10 = Variable | | |
| R11 = Stop | D11 = 0.2778 | | |
| R12 = 2.7842 | D12 = 0.3333 | N7 = 1.63854 | ν7 = 55.4 |
| R13 = −4.5959 | D13 = 0.0832 | | |
| R14 = −2.1560 | D14 = 0.1111 | N8 = 1.80518 | ν8 = 25.4 |
| R15 = −3.2269 | D15 = Variable | | |
| R16 = 4.3594 | D16 = 0.1111 | N9 = 1.84666 | ν9 = 23.9 |
| R17 = 1.9151 | D17 = 0.0193 | | |
| R18 = 2.1825 | D18 = 0.3472 | N10 = 1.51633 | ν10 = 64.1 |
| R19 = −3.9148 | D19 = 0.0208 | | |
| R20 = 2.7545 | D20 = 0.2778 | N11 = 1.51633 | ν11 = 64.1 |
| R21 = −219.0174 | D21 = 0.6944 | | |
| R22 = ∞ | D22 = 0.8333 | N12 = 1.51633 | ν12 = 64.1 |
| R23 = ∞ | | | |

| Separations During Zooming | | | |
|---|---|---|---|
| Focal Length | 1.00 | 2.02 | 7.67 |
| D5 | 0.20 | 1.24 | 2.50 |
| D10 | 2.93 | 1.89 | 0.63 |
| D15 | 1.34 | 1.04 | 1.64 |

Figure 3A:
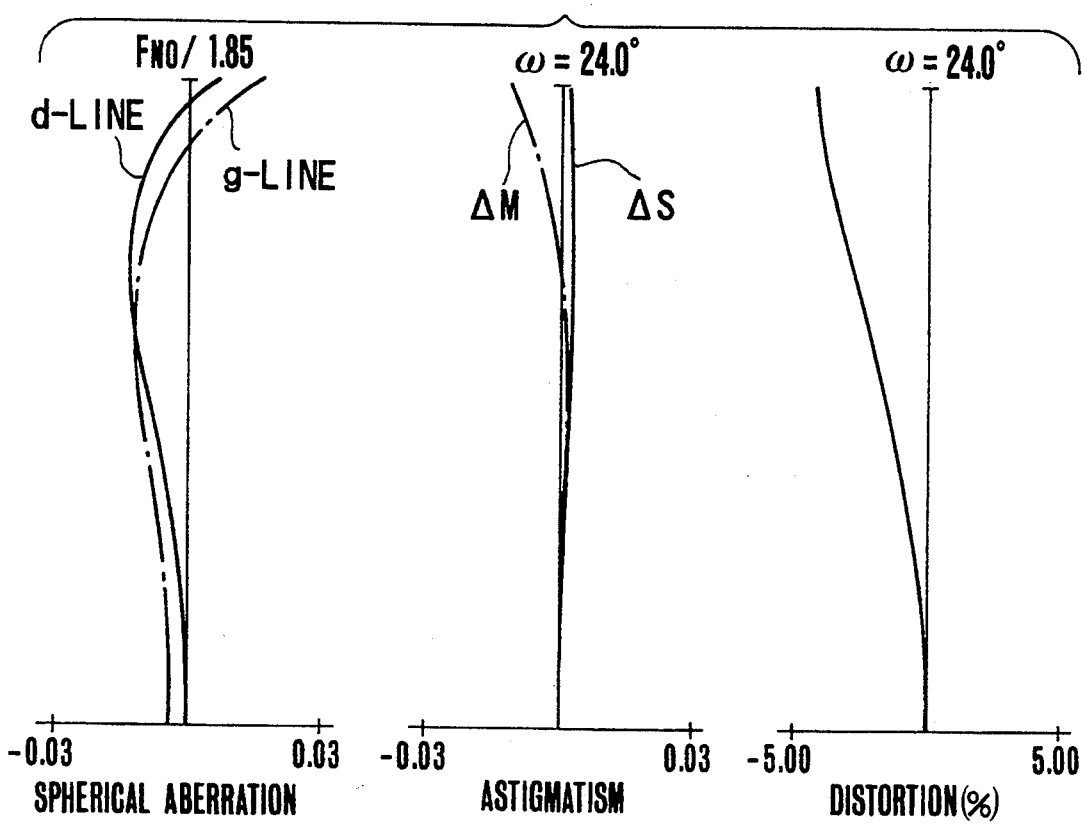
Figure 3B:
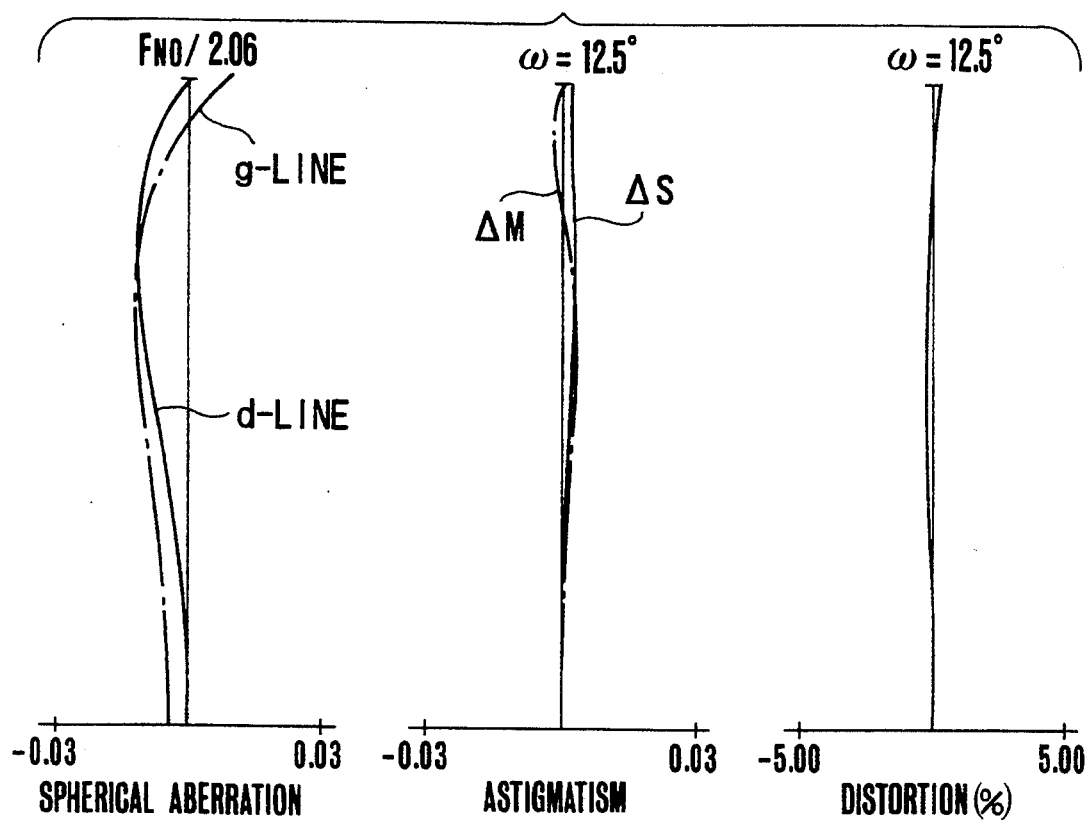
Figure 3C:
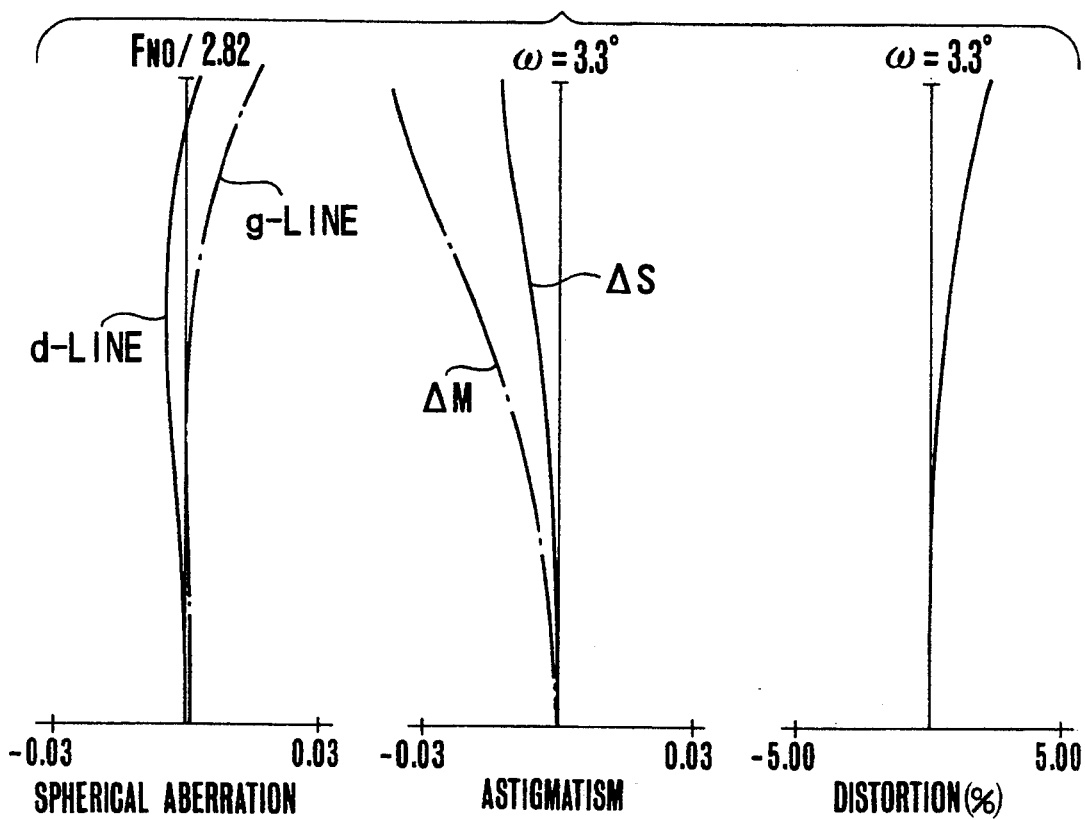

| Numerical Example 2 (FIGS. 3(A), 3(B) and 3(C)): F = 1–7.72  FNo 1:1.85–2.82  2ω = 47.9°–6.6° | | | |
|---|---|---|---|
| R1 = 7.9022 | D1 = 0.1667 | N1 = 1.80518 | ν1 = 25.4 |
| R2 = 3.3235 | D2 = 0.7500 | N2 = 1.51633 | ν2 = 64.1 |
| R3 = −7.8306 | D3 = 0.0278 | | |
| R4 = 2.5029 | D4 = 0.4028 | N3 = 1.60311 | ν3 = 60.7 |
| R5 = 5.9356 | D5 = Variable | | |
| R6 = 18.1868 | D6 = 0.1111 | N4 = 1.69680 | ν4 = 55.5 |
| R7 = 1.0676 | D7 = 0.5517 | N5 = 1.69680 | ν5 = 55.5 |
| R8 = −1.5000 | D8 = 0.0972 | | |
| R9 = 1.5000 | D9 = 0.3750 | N6 = 1.84666 | ν6 = 23.9 |
| R10 = −12.0392 | D10 = Variable | | |
| R11 = Stop | D11 = 0.2778 | | |
| R12 = 3.0007 | D12 = 0.3750 | N7 = 1.63854 | ν7 = 55.4 |
| R13 = −4.2307 | D13 = 0.0898 | | |
| R14 = −2.2185 | D14 = 0.1111 | N8 = 1.80518 | ν8 = 25.4 |
| R15 = −3.2104 | D15 = Variable | | |
| R16 = 4.1662 | D16 = 0.1111 | N9 = 1.84666 | ν9 = 23.9 |
| R17 = 1.8677 | D17 = 0.0716 | | |
| R18 = 2.0582 | D18 = 0.3889 | N10 = 1.51633 | ν10 = 64.1 |
| R19 = −4.0391 | D19 = 0.0208 | | |
| R20 = 2.4136 | D20 = 0.2778 | N11 = 1.51633 | ν11 = 64.1 |
| R21 = 12.6334 | D21 = 0.6944 | | |
| R22 = ∞ | D22 = 0.8333 | N12 = 1.51633 | ν12 = 64.1 |

-continued

Numerical Example 2 (FIGS. 3(A), 3(B) and 3(C)):
F = 1–7.72   FNo 1:1.85–2.82   2ω = 47.9°–6.6°

R23 = ∞

| Focal Length | Separations During Zooming | | |
|---|---|---|---|
|  | 1.00 | 2.01 | 7.72 |
| D5 | 0.19 | 1.23 | 2.49 |
| D10 | 2.93 | 1.89 | 0.63 |
| D15 | 1.44 | 1.13 | 1.74 |

(TABLE 1)

| Conditions | Numerical Example | |
|---|---|---|
|  | 1 | 2 |
| (1) $R_{3,1}/R_{3,3}$ | −1.29 | −1.35 |
| (2) $R_{4,3}/R_{4,5}$ | 0.79 | 0.85 |
| (3) $D_{3,2}/fw$ | 0.083 | 0.090 |
| (4) $D_{4,2}/fw$ | 0.019 | 0.018 |

Figure 4:
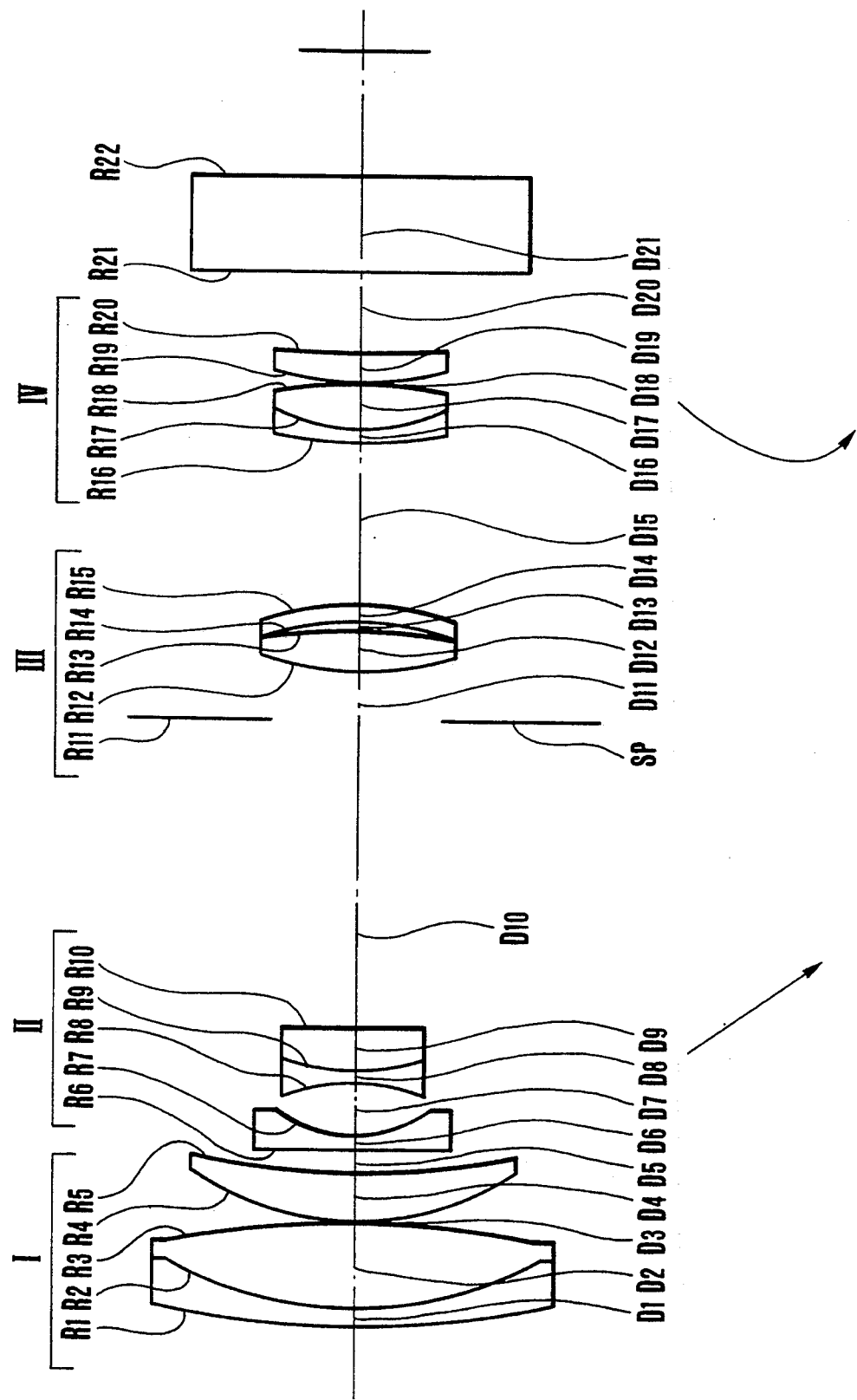
Figure 5A:
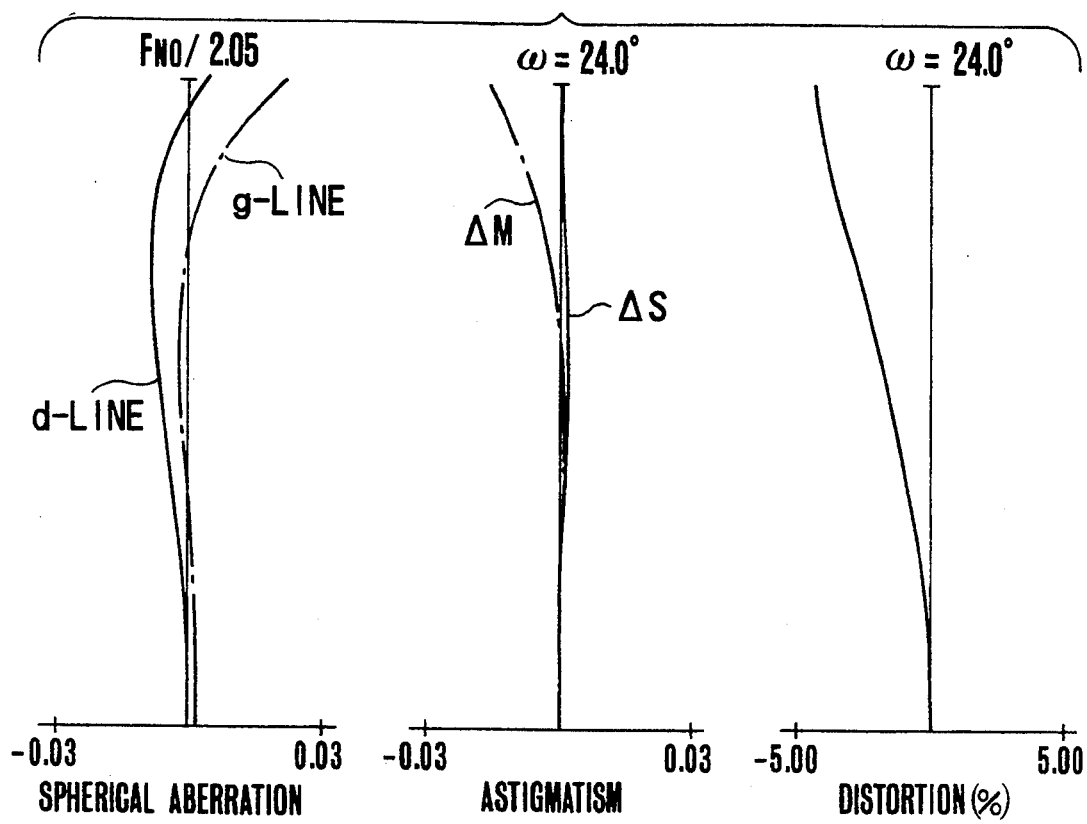
Figure 5B:
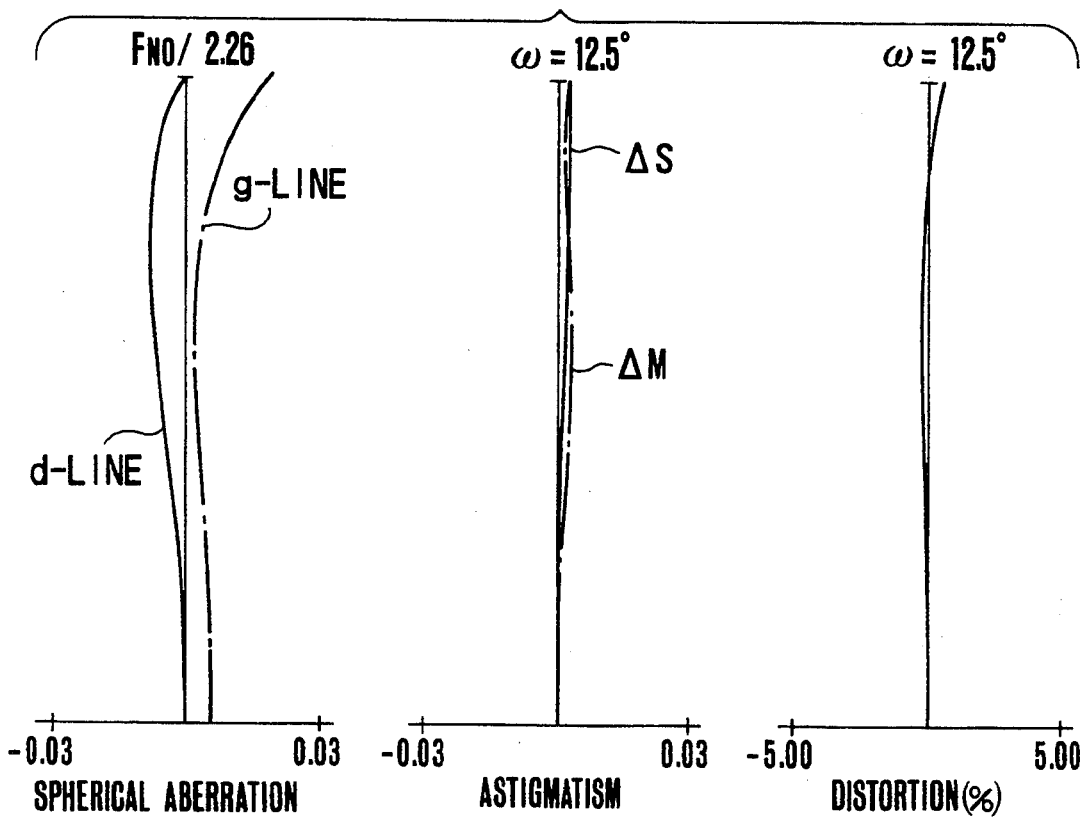
Figure 5C:
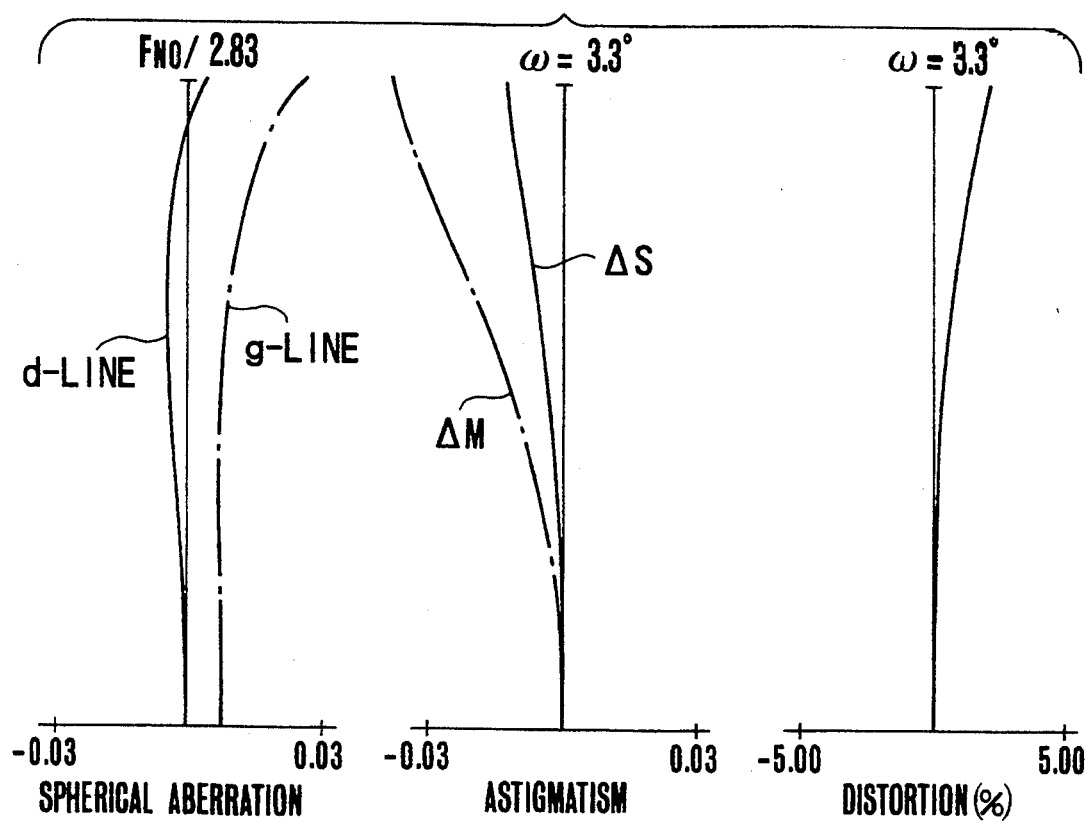

Next, another embodiment which has some improvements on the above-described embodiment is described on the basis of the lens sectional view of FIG. 4.

In the present embodiment, the fundamental form of each lens is the same as in the above-described embodiment, but what is characteristic is in the point that the first lens and the second lens in the fourth lens unit IV are cemented together. Accordingly, lateral chromatic aberration particularly in the telephoto end is corrected well.

Further, it is desirable that, letting the radius of curvature of the j-th lens surface in the i-th lens unit be denoted by $R_{i,j}$, the j-th lens thickness or air separation in the i-th lens unit by $D_{i,j}$, and the focal length in the wide-angle end by fw, the following conditions are satisfied:

$$-1.75 < R_{3,1}/R_{3,3} < -1.10 \quad (5)$$

$$1.30 < R_{4,2}/fw < 1.90 \quad (6)$$

$$5.60 < (R_{4,1}+R_{4,4})/fw < 7.40 \quad (7)$$

$$0.07 < D_{3,2}/fw < 0.12 \quad (8)$$

The inequalities of condition (5) are concerned with the ratio of the radius of curvature of the first lens surface, when counted from the object side, in the third lens unit to the radius of curvature of the third lens surface in the third lens unit, being a condition chiefly for properly correcting spherical aberration. When the lower limit is exceeded, the spherical aberration becomes under-corrected. Also, when the upper limit is exceeded, it becomes over-corrected.

The inequalities of condition (6) are concerned with the radius of curvature of the second or cemented lens surface, when counted from the object side, in the fourth lens unit, being a condition for correcting chromatic aberrations in good balance. When the lower limit is exceeded, the longitudinal chromatic aberration in the telephoto end becomes over-corrected. Also, when the upper limit is exceeded, the lateral chromatic aberration in the wide-angle end becomes under-corrected.

The inequalities of condition (7) are concerned with the radius of curvature of the first lens surface, when counted from the object side, in the fourth lens unit and the radius of curvature of the fourth lens surface in the fourth lens unit, being a condition chiefly for correcting curvature of field and distortion. When the radius of curvature becomes small beyond the lower limit, large distortion of the barrel type is produced in the wide-angle end. Also, when the radius of curvature becomes large beyond the upper limit, the image surface curves in such a manner as to become convex toward the object side, which becomes difficult to correct well.

The inequalities of condition (8) are a condition chiefly for correcting spherical aberration and astigmatism in good balance. When the lower limit is exceeded, the astigmatism becomes large. Also, when the upper limit is exceeded, spherical aberrations of higher order are produced.

Next, numerical examples 3 and 4 of the invention are shown.

Also, the relationship of the above-described inequalities of conditions (5) to (8) and the various numerical values in the numerical examples 3 and 4 is shown in Table-2.

Numerical Example 3 (FIGS. 4, 5(A), 5(B) and 5(C)):
F = 1–7.71   FNo 1:2.05–2.83   2ω = 47.9°–6.6°

| R1 = 8.0315 | D1 = 0.1667 | N1 = 1.80518 | ν1 = 25.4 |
|---|---|---|---|
| R2 = 3.3249 | D2 = 0.7500 | N2 = 1.51633 | ν2 = 64.1 |
| R3 = −7.7696 | D3 = 0.0278 | | |
| R4 = 2.5010 | D4 = 0.4028 | N3 = 1.60311 | ν3 = 60.7 |
| R5 = 5.9842 | D5 = Variable | | |
| R6 = 18.3188 | D6 = 0.1111 | N4 = 1.69680 | ν4 = 55.5 |
| R7 = 1.0726 | D7 = 0.4902 | | |
| R8 = −1.4958 | D8 = 0.0972 | N5 = 1.69680 | ν5 = 55.5 |
| R9 = 1.4958 | D9 = 0.3889 | N6 = 1.84666 | ν6 = 23.9 |
| R10 = −13.6255 | D10 = Variable | | |
| R11 = Stop | D11 = 0.2778 | | |
| R12 = 3.1523 | D12 = 0.3333 | N7 = 1.65844 | ν7 = 50.9 |
| R13 = −4.3235 | D13 = 0.0862 | | |
| R14 = −2.0668 | D14 = 0.1111 | N8 = 1.80518 | ν8 = 25.4 |
| R15 = −2.8224 | D15 = Variable | | |
| R16 = 3.8221 | D16 = 0.1111 | N9 = 1.84666 | ν9 = 23.9 |
| R17 = 1.5873 | D17 = 0.3889 | N10 = 1.51633 | ν10 = 64.1 |
| R18 = −4.1634 | D18 = 0.0208 | | |
| R19 = 2.8249 | D19 = 0.2778 | N11 = 1.51633 | ν11 = 64.1 |
| R20 = 33.6607 | D20 = 0.6944 | | |
| R21 = ∞ | D21 = 0.8333 | N12 = 1.51633 | ν12 = 64.1 |
| R22 = ∞ | | | |

| Focal Length | Separations During Zooming | | |
|---|---|---|---|
|  | 1.00 | 2.01 | 7.71 |
| D5 | 0.21 | 1.25 | 2.51 |
| D10 | 2.93 | 1.89 | 0.63 |
| D15 | 1.46 | 1.16 | 1.77 |

Figure 6A:
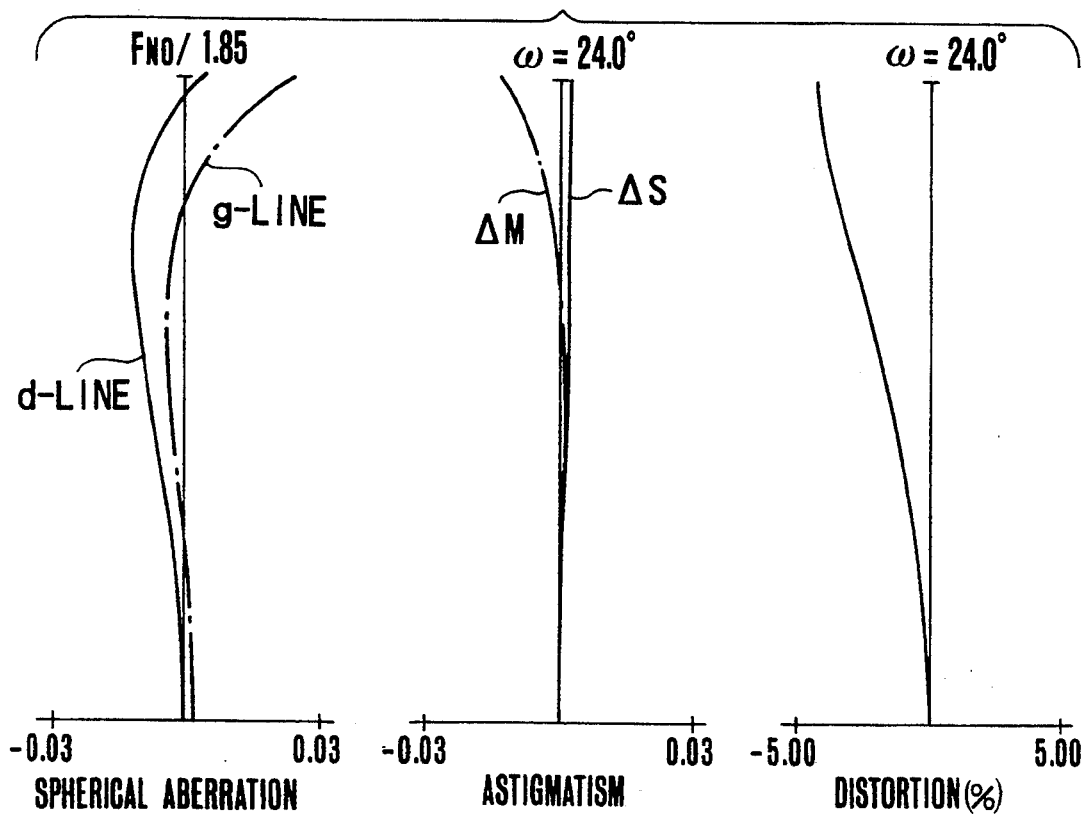
Figure 6B:
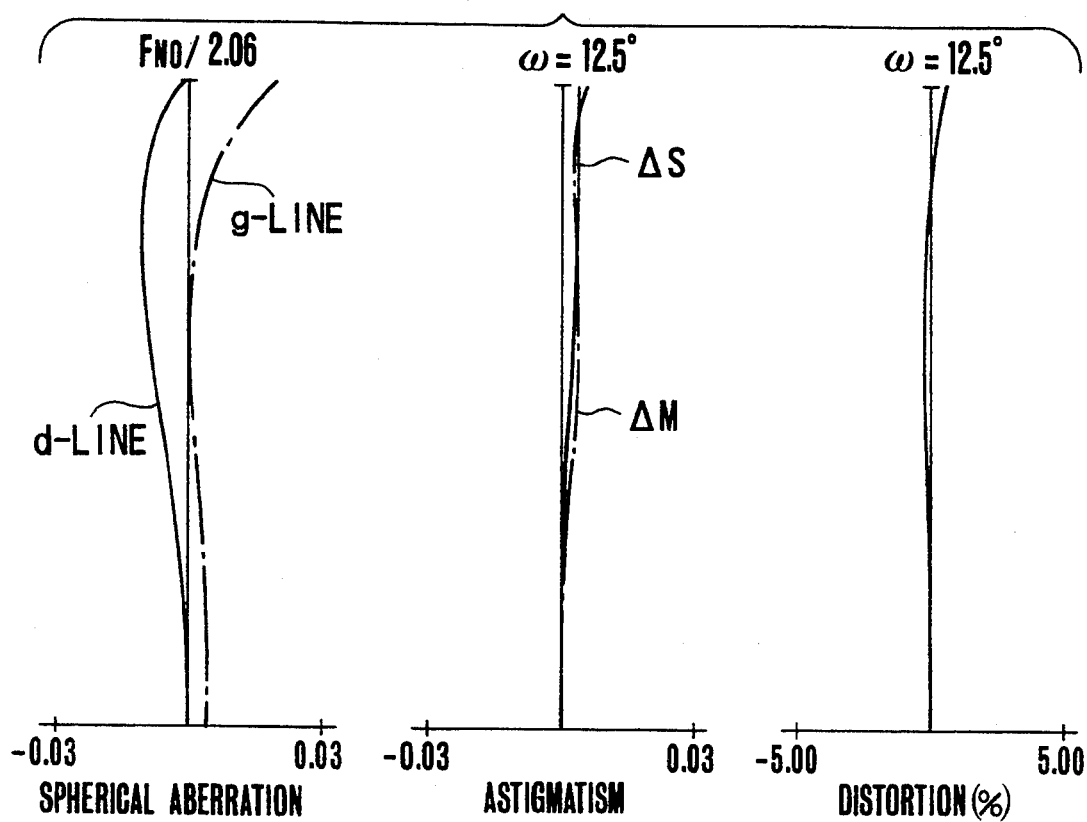
Figure 6C:
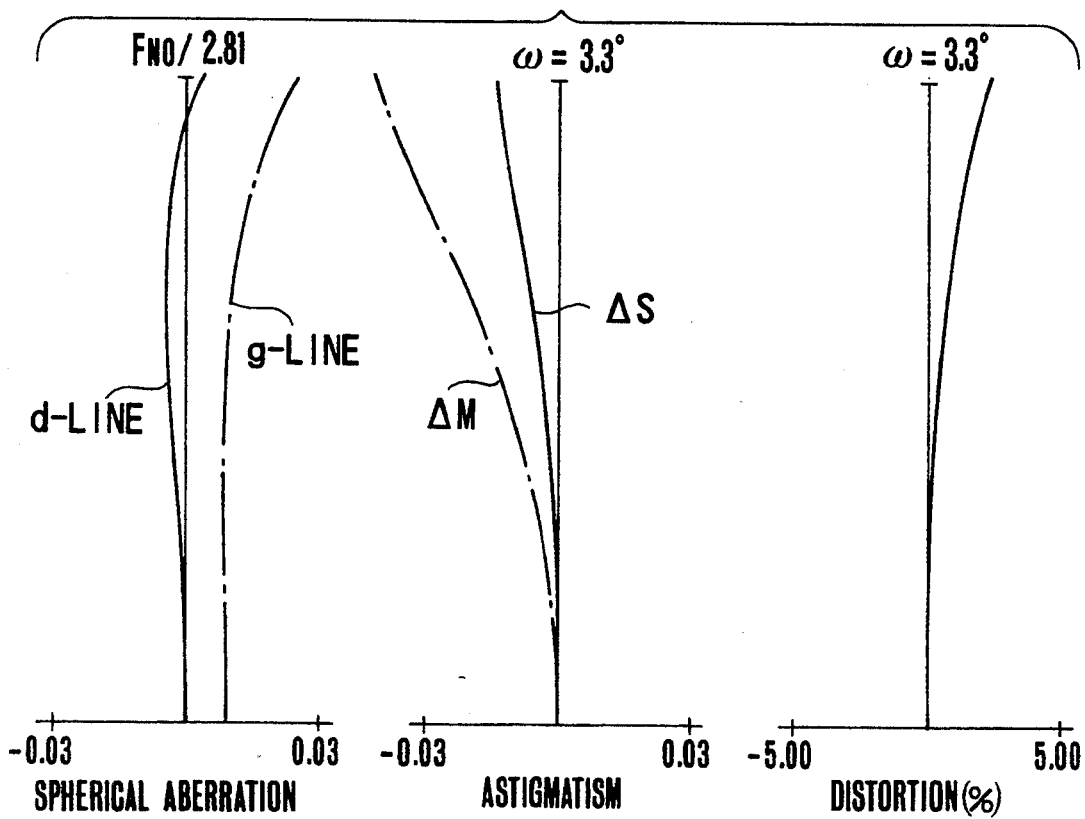

Numerical Example 4 (FIGS. 6(A), 6(B) and 6(C)):
F = 1–7.73   FNo 1:1.85–2.81   2ω = 47.9°–6.6°

| R1 = 8.1576 | D1 = 0.1667 | N1 = 1.80518 | ν1 = 25.4 |
|---|---|---|---|
| R2 = 3.3137 | D2 = 0.7500 | N2 = 1.51633 | ν2 = 64.1 |
| R3 = −7.6997 | D3 = 0.0278 | | |
| R4 = 2.4969 | D4 = 0.4028 | N3 = 1.60311 | ν3 = 60.7 |
| R5 = 6.0283 | D5 = Variable | | |
| R6 = 20.6889 | D6 = 0.1111 | N4 = 1.69680 | ν4 = 55.5 |
| R7 = 1.0619 | D7 = 0.5365 | N5 = 1.69680 | ν5 = 55.5 |
| R8 = −1.4844 | D8 = 0.0972 | | |
| R9 = 1.4844 | D9 = 0.3889 | N6 = 1.84666 | ν6 = 23.9 |
| R10 = −10.9709 | D10 = Variable | | |
| R11 = Stop | D11 = 0.2778 | | |

-continued

Numerical Example 4 (FIGS. 6(A), 6(B) and 6(C)):
F = 1–7.73   FNo 1:1.85–2.81   2ω = 47.9°–6.6°

| | | | |
|---|---|---|---|
| R12 = 3.1915 | D12 = 0.3750 | N7 = 1.65844 | ν7 = 50.9 |
| R13 = −4.1837 | D13 = 0.0892 | | |
| R14 = −2.2205 | D14 = 0.1111 | N8 = 1.80518 | ν8 = 25.4 |
| R15 = −3.1754 | D15 = Variable | | |
| R16 = 3.8793 | D16 = 0.1111 | N9 = 1.84666 | ν9 = 23.9 |
| R17 = 1.5979 | D17 = 0.4167 | N10 = 1.51633 | ν10 = 64.1 |
| R18 = −4.1745 | D18 = 0.0208 | | |
| R19 = 2.4664 | D19 = 0.2778 | N11 = 1.51633 | ν11 = 64.1 |
| R20 = 12.2820 | D20 = 0.6944 | | |
| R21 = ∞ | D21 = 0.8333 | N12 = 1.51633 | ν12 = 64.1 |
| R22 = ∞ | | | |

| | Separations During Zooming | | |
|---|---|---|---|
| Focal Length | 1.00 | 2.01 | 7.73 |
| D5 | 0.21 | 1.25 | 2.51 |
| D10 | 2.93 | 1.89 | 0.63 |
| D15 | 1.49 | 1.19 | 1.80 |

(TABLE 2)

| | Numerical Example | |
|---|---|---|
| Condition | 1 | 2 |
| (5) $R_{3,1}/R_{3,3}$ | −1.53 | −1.44 |
| (6) $R_{4,2}/fw$ | 1.59 | 1.60 |
| (7) $(R_{4,1} + R_{4,4})/fw$ | 6.65 | 6.35 |
| (8) $D_{3,2}/fw$ | 0.086 | 0.089 |

According to the present invention, a zoom lens of compact form and light weight with an F-number of about 1.8–2.0 and still as high a zoom ratio as about 8, having a good optical performance over the entire high range of variation of the magnification, suited to the camera for photography, video camera, etc, can be achieved.

What is claimed is:

1. A zoom lens comprising, in the order from an object side to an image side, a first lens unit of positive refractive power, a second lens unit of negative refractive power, a third lens unit of positive refractive power and a fourth lens unit of positive refractive power, said second lens unit being made to move along an optical axis to effect zooming, said fourth lens unit being made to move so as to compensate for the shift of an image plane resulting from the zooming and being made to move for focusing, said third lens unit including a bi-convex lens and a negative meniscus lens having a concave surface facing the object side, and said fourth lens unit including a negative meniscus lens having a concave surface facing the image side, a bi-convex lens and a positive lens having a convex surface facing the object side, wherein in said fourth lens unit an air space is arranged between the negative meniscus lens and the bi-convex lens, as well as between the bi-convex lens and the positive lens.

2. A zoom lens according to claim 1, wherein letting a radius of curvature of the j-th lens surface in the i-th lens unit be denoted by $R_{i,j}$, a lens thickness or air separation by $D_{i,j}$, and the focal length in the wide-angle end by fw, the following conditions are satisfied:

$$-1.75 < R_{3,1}/R_{3,3} < -1.10$$

$$0.7 < R_{4,3}/R_{4,5} < 1.0$$

$$0.07 < D_{3,2}/fw < 0.12$$

$$0.01 < D_{4,2}/fw < 0.03.$$

3. A zoom lens according to claim 1, which satisfies the condition:

$$0.07 < D_{3'2}/fw < 0.12$$

wherein $D_{3'2}$ is the second lens thickness or air space of said third lens unit and fw is the focal length at the wide angle end.

4. A zoom lens according to claim 1, which satisfies the condition:

$$0.01 < D_{4'2}/fw < 0.03$$

wherein $D_{4'2}$ is the second lens thickness or air space of said fourth lens unit and fw is the focal length at the wide angle end.

5. A zoom lens according to claim 1, which satisfies the condition:

$$-1.75 < R_{3'1}/R_{3'3} < -1.10$$

wherein $R_{i'j}$ is the radius of curvature of the jth lens surface of said ith lens unit.

6. A zoom lens according to claim 1, which satisfies the condition:

$$0.7 < R_{4'3}/R_{4'5} < 1.0$$

wherein $R_{i'j}$ is the radius of curvature of the jth lens surface of said ith lens unit.

7. A zoom lens comprising, in the order from an object side to an image side, a first lens unit of positive refractive power, a second lens unit of negative refractive power, a diaphragm, a third lens unit of positive refractive power and a fourth lens unit of positive refractive power, said first and third lens units being stationary, said second lens unit being made to move to effect zooming, said fourth lens unit being made to move so as to compensate for the shift of an image plane resulting from the zooming and being made to move for focusing, said third lens unit including a bi-convex lens and a negative meniscus lens having a concave surface facing the object side, and said fourth lens unit including a negative meniscus lens, having a concave surface facing the image side, and a bi-convex lens, which are cemented together, and a positive lens having a convex surface facing the object side, wherein said diaphram is located immediately before said third lens unit.

8. A zoom lens according to claim 7, wherein letting a radius of curvature of the j-th lens surface in the i-th lens unit be denoted by $R_{i,j}$, a lens thickness or air separation by $D_{i,j}$, and the focal length in the wide-angle end by fw, the following conditions are satisfied:

$$-1.75 < R_{3,1}/R_{3,3} < -1.10$$

$$1.30 < R_{4,2}/fw < 1.90$$

$$5.60 < (R_{4,1} + R_{4,4})/fw < 7.40$$

$$0.07 < D_{3,2}/fw < 0.12.$$

9. A zoom lens according to claim 7, which satisfies the condition:

$$-1.75 < R_{3'1}/R_{3'3} < -1.10$$

wherein $R_{ij}$ is the radius of curvature of the jth lens surface of said ith lens unit.

10. A zoom lens according to claim 9, which satisfies the condition:

$$1.30 < R_{4'2}/fw < 1.90$$

$$5.60 < (R_{4'1} + R_{4'4})/fw < 7.40$$

wherein $R_{i,j}$ is the radius of curvature of the jth lens surface of said ith lens unit, and fw is the focal length at the wide angle end.

11. A zoom lens according to claim 7, which satisfies the condition:

$$0.07 < D_{3'2}/fw < 0.12$$

wherein $D_{3'2}$ is the second lens thickness or air space of said third lens unit and fw is the focal length at the wide angle end.

12. A zoom lens according to claim 11, which satisfies the conditions:

$$1.30 < R_{4'2}/fw < 1.90$$

$$5.60 < (R_{4'1} + R_{4'4})/fw < 7.40$$

wherein $R_{ij}$ is the radius of curvature of the jth lens surface of said ith lens unit, and fw is the focal length at the wide angle end.

* * * * *

UNITED STATES PATENT AND TRADEMARK OFFICE
CERTIFICATE OF CORRECTION

PATENT NO. : 5,353,157
DATED : October 4, 1994
INVENTOR(S) : AKIHISA HORIUCHI

It is certified that error appears in the above-identified patent and that said Letters Patent is hereby corrected as shown below:

ON COVER PAGE

AT INVENTOR, "Kanagawa" should read --Kawasaki--.

COLUMN 1

Line 1, "Art:" should read --Art--.

COLUMN 2

Line 42, "monotonously" should read --monotonically--.

COLUMN 4

Line 12, "2(C):" should read --2(C)):--.
    Line 38, "Separations" should read --Separation--.

COLUMN 5

Line 8, "Separations" should read --Separation--.

COLUMN 6

Line 48, "Separations" should read --Separation--.

UNITED STATES PATENT AND TRADEMARK OFFICE
CERTIFICATE OF CORRECTION

PATENT NO. : 5,353,157
DATED : October 4, 1994
INVENTOR(S) : AKIHISA HORIUCHI

It is certified that error appears in the above-identified patent and that said Letters Patent is hereby corrected as shown below:

<u>COLUMN 7</u>

Line 17, "Separations" should read --Separation--.

Signed and Sealed this

Second Day of January, 1996

Attest:

BRUCE LEHMAN

*Attesting Officer*   *Commissioner of Patents and Trademarks*